United States Patent [19]

Leach

[11] 4,264,963

[45] Apr. 28, 1981

[54] STATIC LATCHES FOR STORING DISPLAY SEGMENT INFORMATION

[75] Inventor: Jerald G. Leach, Houston, Tex.

[73] Assignee: Texas Instruments Incorporated, Dallas, Tex.

[21] Appl. No.: 46,887

[22] Filed: Jun. 8, 1979

[51] Int. Cl.[3] .......................... G06F 3/14; G06F 15/02

[52] U.S. Cl. .................................... 364/707; 340/811; 364/710

[58] Field of Search ................ 364/707, 710; 340/766, 340/767, 776, 784, 811

[56] References Cited

U.S. PATENT DOCUMENTS

| | | | |
|---|---|---|---|
| 3,755,806 | 8/1973 | Bunting | 364/707 |
| 3,922,526 | 11/1975 | Cochran | 364/707 |
| 4,078,374 | 3/1978 | Kondo | 340/811 |
| 4,087,861 | 5/1978 | Futagawa et al. | 364/710 X |

*Primary Examiner*—Jerry Smith

*Attorney, Agent, or Firm*—David H. Sitrick; Richard L. Donaldson; Melvin Sharp

[57] ABSTRACT

Display information is stored in an array of segment latches, and by addressing these latches with common signals, the number of instructions necessary to operate a calculator in a display mode is greatly reduced. Thereby, the operation frequency of the calculator in the display only mode may be reduced, reducing the power consumption for CMOS devices.

6 Claims, 10 Drawing Figures

STATIC LATCHES FOR STORING DISPLAY SEGMENT INFORMATION

BACKGROUND OF THE INVENTION

This invention relates to a display interface system and more particularly to the use of an array of addressable segment latches in a display interface to reduce the number of instructions necessary to operate a calculator in the display mode.

Widely used displays include light emitting diode, liquid crystal, gas discharge, and electrochromatic types. Widely used techniques of display interface include digit scan, segment scan, and common scan, the type of display interface utilized being in part dependent on the type of display selected. Both the digit scan and segment display interface system utilize a display matrix comprised of multiple segment common lines intersecting with multiple digit common lines. For a segment of a particular digit to be enabled, the respective segment and digit common lines for that segment and digit must be enabled. In a digit scan display interface, the character is decoded into the segment outputs representing the desired display digit, and a single digit line is enabled so as to display the decoded segment data. The next character of display is decoded into segment information and the next consecutive digit line is scanned, etc., this process is cyclically repeated such that the on duty cycle of each digit equals the reciprocal of the number of digit lines scanned. In a segment scan display interface, each segment line is consecutively enabled in a cyclic fashion, with the display character decode selectively enabling the proper subset of digit lines. The ON duty cycle of each segment is the reciprocal of the number of segment lines scanned per cycle. The digit scan and segment scan techniques have found widespread applications in light emitting diode displays.

A recent innovation utilized in conjunction with liquid crystal displays is the common scan display interface. In a typical common scan system, there are three common scan lines which form a matrix with segment lines and which are cyclically enabled. The number of segment lines in the matrix is equal to one third of the total number of segments in the display. The ON duty cycle of each segment is the reciprocal of the number of common scan lines, that is, one-third ($\frac{1}{3}$). Alternately, a configuration of two and four common scan lines has also been utilized. During each common time interval, a complete digit scan cycle is required to provide the display segment information. During each digit scan interval within the digit scan cycle, the segment information is further decoded corresponding to the associated common scan line, and the decoded common segment data is stored in a latch array for application to the segments during that common scan time interval. Since each common scan line is associated with fixed segments of each digit, the output of each latch of the latch array may be connected to three segments of each digit position, each of the three segments corresponding to a different one of the three common scan lines. Since a single display cycle requires six common time intervals in a liquid crystal display, three positive voltage and three negative voltage common time intervals, the common scan display interface for an eight digit display required 48 character inputs per display cycle, and must perform 48 two-level decodes or 96 decode operations per display cycle, and must store the decoded segment common information in the latch array 48 times per display cycle. Thus, in an eight digit display calculator, the processor must access its read/write random access memory (RAM) for each respective display digit code, and output this code to the common scan display interface 48 times each display cycle. Therefore, even in a display only mode, the processor must continue to operate at a clock frequency adequate to provide display output data to the display interface. Furthermore, since in CMOS logic the power is proportional to the frequency, the operating frequency of the calculator processor during the display mode directly impacts battery life.

SUMMARY OF THE INVENTION

In accordance with an embodiment of the invention, a common scan display interface is comprised of a multiple segment latch array connected to the inputs of a multiple-bit parallel to one-of-three multiplexer, the three common scan lines controlling the select function of the multiplexer to determine which of the segment latch inputs will be output from the multiplexer to the actual display segments. Each multiplexer output is connected to three display segments, each of the three display segments corresponding to a different common scan line. During the first common scan time interval of a display cycle, one digit scan cycle is completed, and the segment information decoded during each digit scan time interval is stored in a segment latch array corresponding to the digit represented. Thus, each segment of the display has a corresponding segment latch wherein the state of that segment for the present display cycle is stored. The interconnection of the outputs from the segment latches to the inputs of the one-of-three multiplexer select logic provides for proper segment data output to the display matrix in response to activation of the common scan line select input to the multiplexer. Therefore, the number of instructions necessary to operate a calculator in the display mode can be reduced greatly. Furthermore, since all information necessary for a complete display is present after only one digit scan cycle, the display interface and display do not require processor interface or instructions during the remainder of the display cycle, thereby reducing processor to display interface instructions by at least 80%. In another embodiment, no additional processor interface or instructions are required until the display is to be changed which may be many display cycles later. Thus, the operating frequency of the calculator in the display only mode may be greatly reduced, reducing the power consumption for CMOS devices.

BRIEF DESCRIPTIONS OF THE DRAWINGS

The novel features believed characteristic of the invention are set forth in the appended claims. The invention itself, however, as well as other features and advantages thereof, will best be understood by reference to the detailed description which follows, read in conjunction with the accompanying drawings, wherein:

FIG. 1 is a detailed block diagram of one type of MOS/LSI calculator chip including the display system principles of the invention, in particular, the chip 420 of FIG. 6;

FIGS. 2*a*–2*d* are a graphic representation of the display voltages of FIG. 1, plotted against time;

FIGS. 3*a*–*b* is a schematic diagram of the display voltage generator 40 and display voltage converter for commons 52 of FIG. 1;

DETAILED DESCRIPTION OF THE DRAWINGS

Figure 1:
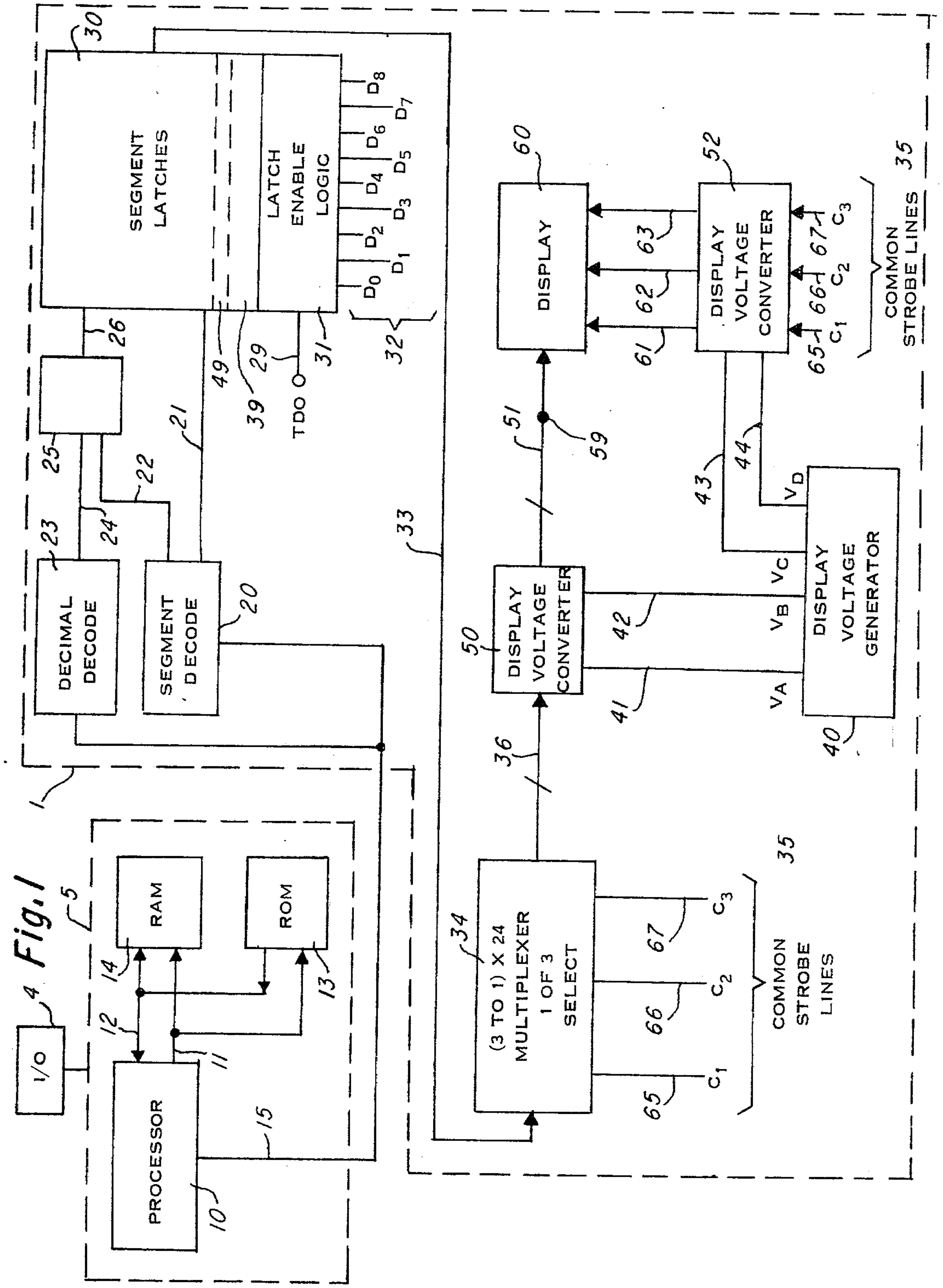
Figure 6:
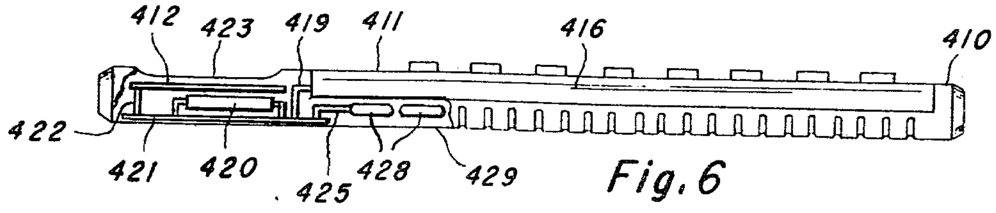
FIG. 6 is an elevation view in section of the calculator of FIG. 5, taken along the line 6—6 of FIG. 5.

A block diagram of the system within the chip 420 of FIG. 6 is shown in FIG. 1. This system is a digit processor chip, such as that described in U.S. Pat. Nos. 3,991,305 or 4,014,013. The system is shown as being comprised of two sub-systems, the display interface and the processor and user input interface as described in copending applications Ser. Nos. 046,888; 106,430; and 047,431. The processor sub-system and user input interface is comprised of a keyboard 4 for providing a means of user data input. The keyboard 4 is connected to the processor/memory sub-system 5. The processor subsystem scans and decodes the user input from the keyboard 4, either continuously, or upon detection of a key depression as described in co-pending application Ser. No. 106,430, Turn Off Processor Between Key Strokes. The processor system 5 is centered around a ROM (read-only-memory) 13 and a RAM (random-access-memory) 14. The ROM 13 contains a large number, for example, 1024 or 2048, instruction words of 8 or 9 bits per word, and is used to store the program which operates the system. The RAM 14 contains 256 up to 1024 or greater memory cells organized as 4 to 16 (or greater)-digit groups with 4 bits per digit. The number of words in the ROM 13 or cells in the RAM 14 depends on desired complexity of the calculator functions. Numerical data entered by the keyboard 4 is stored in the RAM 14, along with intermediate and final results of calculations, as well as status information or flags, decimal point positions, and other working data. The RAM 14 functions as the working registers of the calculator system, although it is not organized in a hardware sense as separate registers as would be true if shift registers or the like were used for this purpose. Additionally, the output of the RAM 14 is selectively connected to the display interface 1.

The ROM 13 produces an 8 bit or 9 bit instruction word on ROM output lines 12 during each instruction cycle. The instruction is selected from 8192 bit locations in the ROM, organized into 1024 words containing 8 bits each, for a minimum function calculator, or from 18,432 bit locations organized into 2089 9 bit instruction words for a complex function calculator. Other organizations may also be used as needed. The operation of the processor system 5 as related to the ROM, RAM, and numerical function circuitry may be better understood by reference to U.S. Pat. No. 4,115,705.

The RAM 14 is utilized by the processor system 5 to store display data. The processor sub-system 5 provides both the digit data, as decoded, for example, in binary coded decimal format, and output on connector 15, but additionally supplies digit stroke synchronization signals on connector 32, connecting two display interfaces 1, for coordinating digit segment decode storage in the segment latches 30 of the display interface 1. Furthermore, in a preferred embodiment, the processor sub-system 5 provides decimal position information on connector 15 to the display interface 1.

The display digit information output on connector 15 as 4 bit BCD data is connected to the segment decode array 20. The segment decode array 20 may be a ROM or PLA (programmable-logic array), which translates the 4 bit BCD data into the appropriate segment data necessary to effectuate the display of the BCD encoded digit. The decode array 20 may provide 7 or 8 segment decodes, depending on whether a separate decimal decode is utilized. In a preferred embodiment, the decimal point decode is separate from the segment decode to conserve size and allow more characters to be decoded in the decode array 20. Where the decimal point is decoded in the segment data, an 8 segment decode is required for each character 0–9, and 0.-9.. This utilizes 16 characters of PLA 20 decode. Therefore, by utilizing a separate decimal position decode 23, 8 characters of PLA decode are saved and may be used for additional character decode or the size of the decode array 20 may be decreased. In the preferred embodiment, the decimal position data is output from the processor system 5 via connector 15 to the decimal decode array 23. During the appropriate digit strobe synchronization time interval, a decimal decode valid signal is output via connector 24 to a programmable decimal source select 25. The optional 8 segment decode output from decode array 20 is connected via connector 22 to the source select 25. At time of manufacture, the decimal point source select may be programmed so as to connect either connection 24 or connection 22 to the output of the source select 25 via connector 26 to the eighth segment data line connected to segment latch array 30. The decode 7 segments of array 20 corresponding to the digit to be displayed are output via connector 21 to the segment latch array 30.

The segment latch array 30 contains a static latch for each segment on the display 60, including decimal point. Segment data is loaded into the segment latches 30 one digit group at a time, each digit group corresponding to one digit of the display comprised of 8 segments corresponding to each digit plus related decimal point. A transfer data to output signal (TDO) from the processor system 5 is output via connector 29 to the latch enable digit group select logic 31 of the segment latch array 30 is operatively enabled in response to an active signal level on connector 29. When the latch enable logic 31 is operatively enabled, the active one of the digit group select strobe input lines 32 connected to the latch enable logic 31 will selectively enable an 8 bit segment latch of the latch array 30 to store the segment data input from connections 21 and 26. For example, the digit 0 information is output from processor system 5 via connector 15 to the segment decode 20 and decimal position decode 23, where the segment decode translation is effected, and the 8 bits of segment information are output to the segment latches 30. Simultaneously, the processor system 5 outputs an active signal on digit strobe lines 32, digit 0 position, and inactive digit strobe line signals on all other digit strobe line positions. The processor system 5 then, at the appropriate time, outputs a transfer data to output signal (TDO) via connector 29 to the latch enable logic 31, thereby enabling digit 0 digit group latch 39 of the segment latch array 30 to store the 8 bit segment data for digit 0. Next, the transfer data to output signal (TDO) from the processor system 5 is brought to an inactive state, thereby disabling latch enable logic 31, causing digit group 0 latch 39, and all other digit group latches, to be de-selected, so as to no longer be responsive to the segment data inputs, thereby effectively storing the proper digit 0 segment data in the digit 0 segment latch 39. The processor system 5 accesses the RAM 125 for the next digit display data, digit 1, which is output on connector 15 to the segment decode 20 and decimal decode 23, where segment data would be output to the segment latch 30 as described with reference to digit 0 decode. The digit 1 position of digit strobe lines 32 would be activated and all other positions of digit strobe lines 32 would be inactivated. Next, after an appropriate time delay, the transfer data to output signal (TDO) is output from processor system 5 to the latch enable logic 31 via connector 29, thereby enabling the digit 1 digit group latch 49 to store the digit 1, 8 bit segment data. The transfer data to output signal (TDO) from processor system 5 would then go inactive, thereby disabling the segment latches 30 from being responsive to the segment data inputs, and effectively storing digit 1 segment data. This process is repeated for digits 2, 3, etc., until all display digit positions have been stored in the segment latches. The segment latch array 30 will then contain complete segment data information for the entire display, and does not require further interface with the processor sub-system 5 until and unless the display information is to be changed.

While the 8 segment data bits input to segment latches 30 form common inputs to each digit segment latch within the segment latch array 30, all display segment output signals, forming the display signal output group, from the segment latch array 30 are independently and separately brought out from the segment latch array 30 via conductor bus 33 connecting to display multiplexer select logic means 34. In a preferred embodiment of 9 digit positions in the display, the display multiplexer 34 is comprised of a 3 to 1 by 24 wide multiplexer array, which selectively connects 24 of the 72 segment latch outputs from bus 33 to the output of multiplexer 34 and therefrom via bus connector 36 is connected to a display interface signal converter 50. The group select inputs of the multiplexer 34 is connected to the group select signal 35. The group select signal 35 is comprised of 3 select anode common strobe lines C1, C2 and C3, only one of which is active at any given time. The activation of one of the common strobe lines 35 causes the multiplexer 34 to select one of a plurality of subgroups of the display segment output group to be output from the multiplexer 34. The common strobe lines 35 are also connected to a second display interface signal converter 52. A display voltage generator 40 provides output reference voltages $V_a$41 and $V_b$42 to the display converter 50, and provides reference voltages $V_c$43 and $V_d$44 to the display converter 52. The signals $V_a$41, $V_b$42, and $V_c$43, and $V_d$44, are bilevel signals having a first defined voltage signal level during the first 3 common strobe time intervals of a display cycle and having a second voltage signal level during the subsequent 3 common strobe signal time intervals. Thus, the liquid crystal display is provided with the necessary alternating signal level for a proper operation. The display converter 50 provides display drive and signal translation, in a preferred embodiment, for each of the inputs from the multiplexer 34. For example, for a 9 digit position display, the segment latch array 30 has 72 segment data outputs on conductor bus 33, and the multiplexer 34 has 24 outputs. The logic state of each input, on or off, selects the voltage $V_a$41, or $V_b$42, respectively, to be connected to the corresponding output of display converter 50 via connector bus 51. For example, there would be 24 outputs of the display converter 50 for the 9 digit display, each corresponding to one of the 24 inputs to the display converter 50. The output bus connector 51 is connected to connection node 59 for interconnection to the display 60. Each of the outputs on conductor bus 51 via connection node 59 connects to 3 segments of the display 60, each segment corresponding to and forming a matrix with a corresponding common strobe time interval when a single common strobe line C1, C2 or C3, 35, is active, only the segments of the display matrix intersecting with the activated common strobe line are activated to a display mode.

Similarly, the display converter 52 has common scan line outputs 61, 62, and 63 connected to the display 60 each corresponding to common strobe lines C1 65, C2 66, and C3 67, of the common strobe line bus 35. The outputs 61, 62 and 63, of the display converter 52 are selected to be the display voltage signal $V_c$43 or $V_d$44, corresponding to the on or off state, respectively, of common strobe lines C1 65, C2 66, or C3 67, respectively. When an intersection point of the display matrix has a $V_c$ voltage signal applied to the common strobe line 35, and a $V_a$ signal applied to the segment output of display converter 50, the display segment is turned on into the visible display mode. Any other combination of display voltage signals at an intersection point in the display matrix of the display 60 results in the segment being turned off in the non-display or transparent mode.

Figure 2:
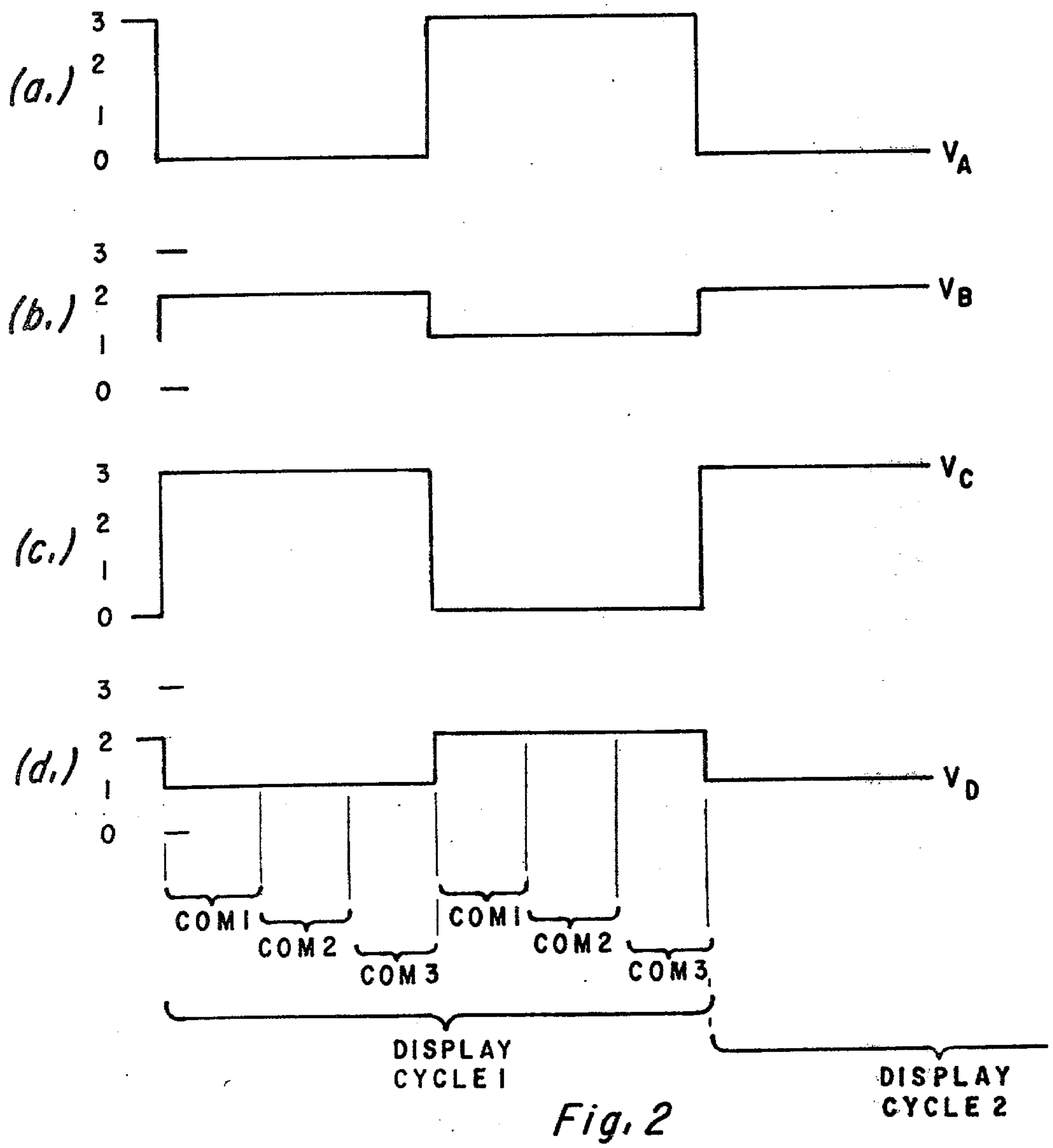

Referring to FIGS. *2a–2d*, the display voltage signals $V_a$, $V_b$, $V_c$ and $V_d$, 41, 42, 43 and 44, respectively, of FIG. 1 are shown plotted against common scan time intervals COM 1, COM 2, and COM 3 corresponding to the common 1 scan time, common 2 scan time, and common 3 scan time during which the corresponding common signal is active. As seen from FIG. 2, each display cycle is made up of two common scan intervals, each common scan interval comprised of a complete common scan time interval wherein common 1, common 2, and common 3 signals are consecutively activated, repeating in a periodic manner. The display voltages $V_a$, $V_b$, $V_c$, $V_d$, of FIGS. *2a–2d*, respectively, are bilevel signals, each having a first steady state signal level during the first common time interval, and having a second steady state signal level during the second common scan interval of a display cycle. As described with reference to FIG. 1, a display mode for a segment occurs when the intersecting common scan line and segment line are at display voltages $V_a$, and $V_c$, respectively. As seen from FIGS. *2a* and *2c*, this corresponds to a 3 volt differential across the liquid crystal display segment. As can be readily seen from FIGS. *2a–2d*, any other combination of display voltages ($V_a$, $V_d$; $V_b$, $V_c$; or $V_b$, $V_d$) results in only a 1 volt differential being applied across the liquid crystal display segment, which is inadequate to enable the display to a display on mode. Since during each display cycle an alternating voltage is applied across each segment, the applied voltage across the liquid crystal display at each segment is measured as the RMS (root-mean-square) voltage. The RMS voltage across the liquid crystal display at any segment/-common intersection point is equal to the sum of the square of the voltage across the segment during each common time interval common 1, common 2, common 3, for both common scan intervals of the display cycle, the sum of the squares divided by the number of common time intervals, six in the case of a single display cycle, the square root of this quantity being equal to the RMS voltage across the segments during the display cycle.

Figure 4:
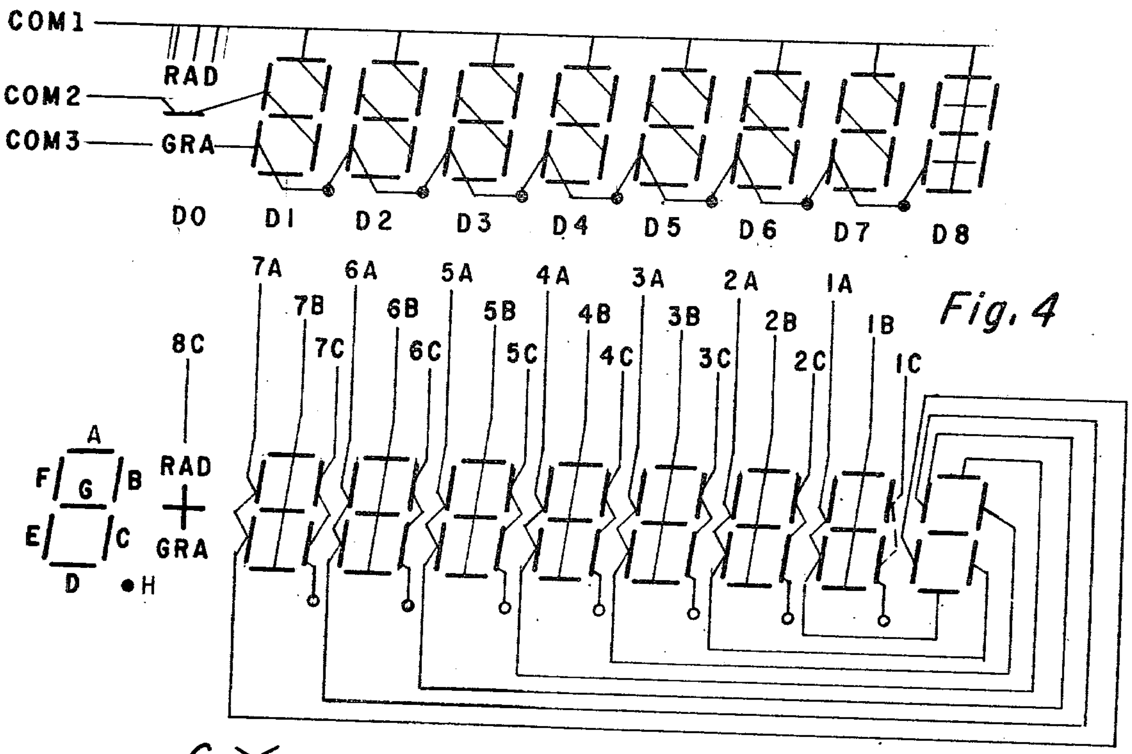
FIG. 4 is a schematic diagram of the segment interconnect of the display 412 of FIG. 6.

Referring again to FIG. 1, the segment latch array 30 is comprised of multiple static latches, with a plurality of static latches forming the segment latch array 30. The multiplexer select logic 34 is comprised of multiple and nor gate arrays, the output of the segment latch array 30 connected via bus connector 33 to the select logic and nor logic arrays so as to output via connector 36 segment A, B, and F data bits during common 1 time interval, segment C and G data bits during common 2 time interval, and segment H, E, and D data bits during common 3 time interval, for each digit time interval for each digit. The segment and common line interconnections of the display as shown in FIG. 4, correspond to the input groupings to the and nor gate arrays of the multiplexer select logic 34 to form a complementary operative unit.

Figure 3A:
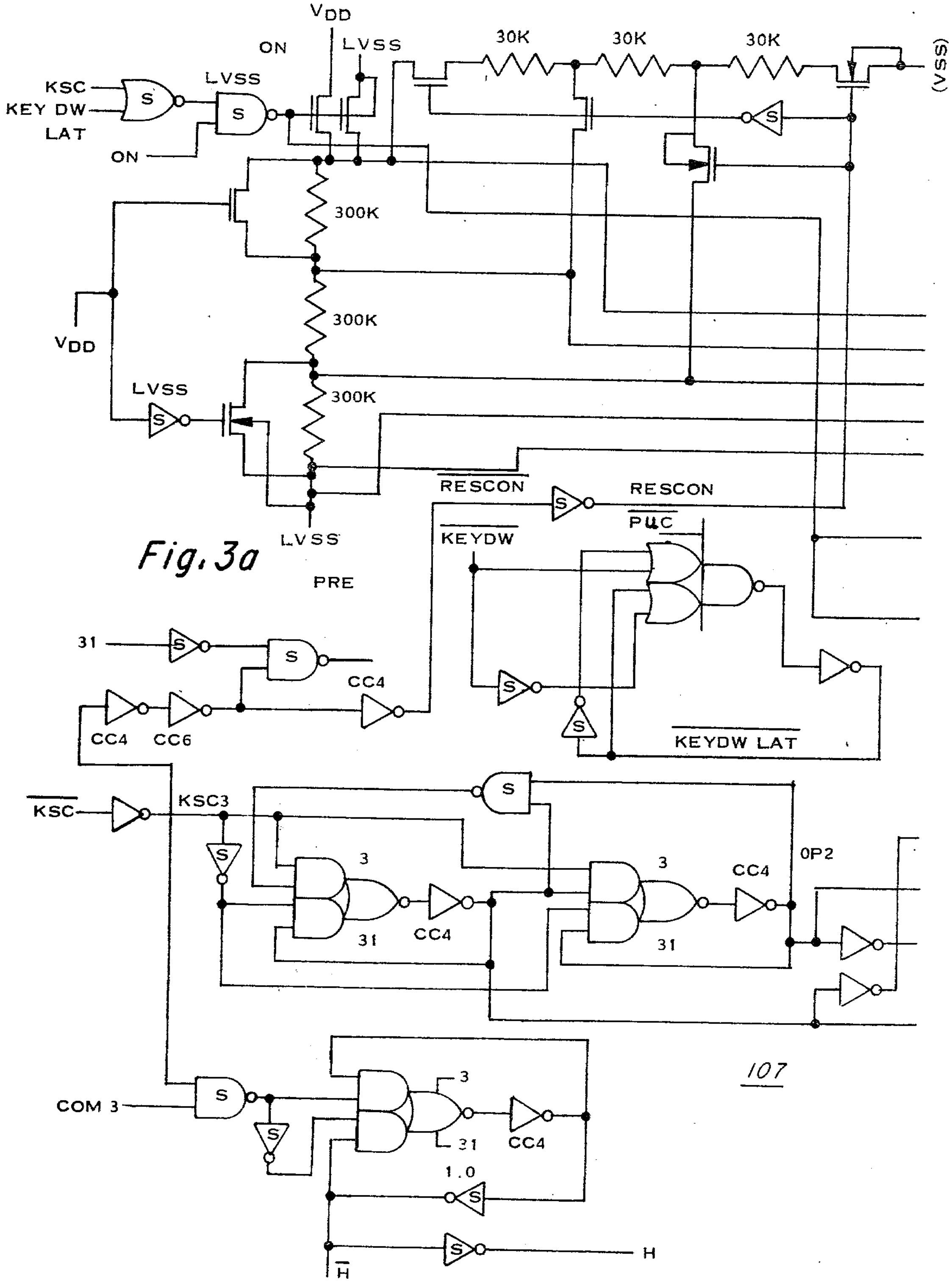
Figure 3B:
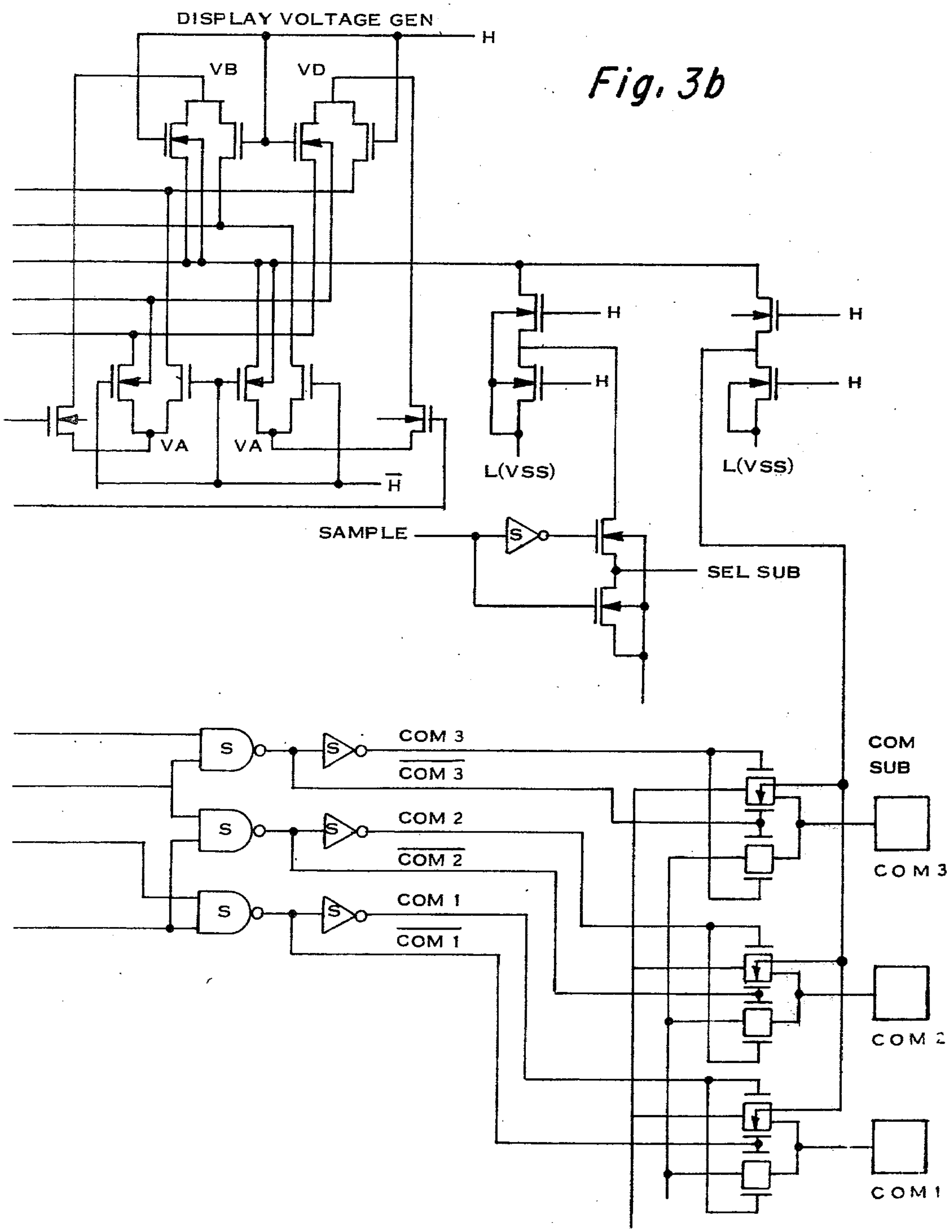

Referring to FIGS. 3*a*–*b* the common line interconnect and segment line interconnect schematic are shown. As shown in FIG. 4, segments A and B of each digit are interconnected on common 1, segments G, F and C are interconnected on common 2, and segments E, D and H are interconnected on common 3, corresponding to common/segment groupings to the and nor gate array 201. Thus, proper operation of the display and display interface is accomplished.

Figure 5:
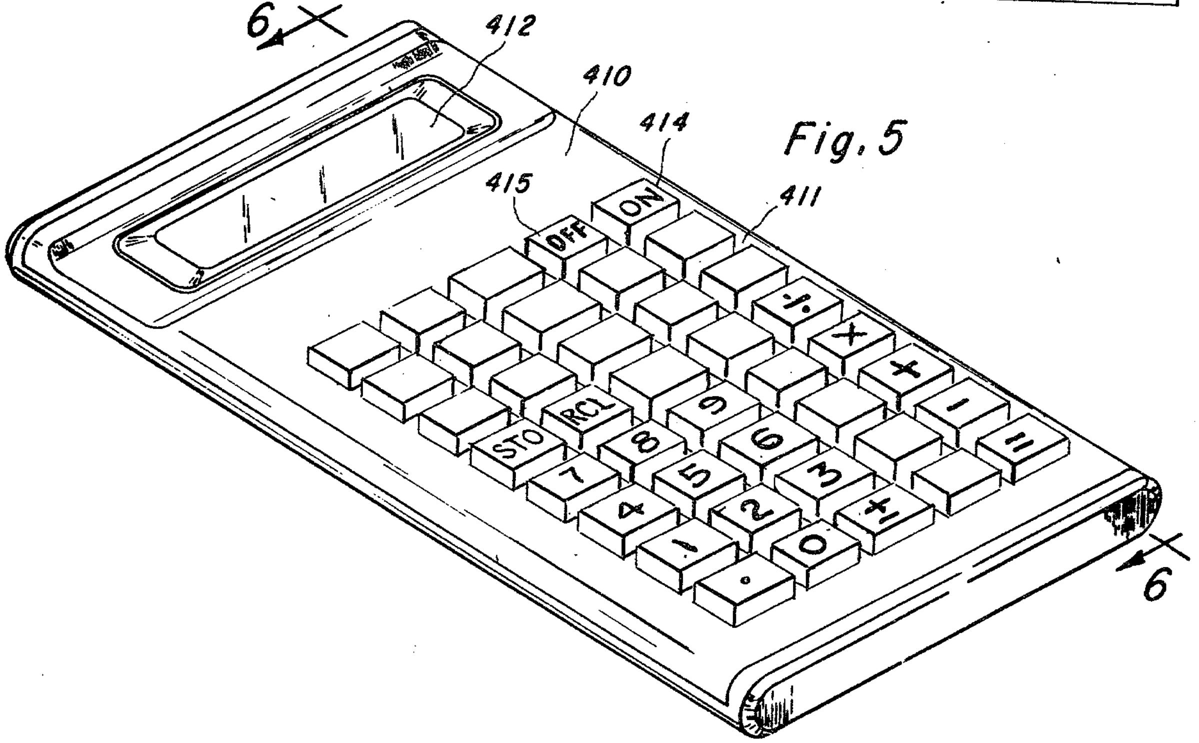
FIG. 5 is a pictorial view of a small hand-held calculator in which the invention may be utilized.

Referring to FIG. 5, a typical small electronic calculator in which the invention finds utility is shown, comprising a case or housing 410 of molded plastic or the like, with a keyboard 411 and a display 412. The keyboard includes number keys 0–9, a decimal point key, and several standard operation keys such as +, −, ×, ÷, etc. In some embodiments, the calculator system could perform a variety of additional functions, so keys such as $\sqrt{X}$, $\sqrt[y]{X}$, $Y^x$, SIN, COS, TAN, LOG, %, LN, STO, RCL, etc., may be included in the keyboard 411. The display 412 has a number of digits of seven segment type, with decimal points. Displays of eight, 10 or 12 digits are standard and these may also include exponents for scientific notation, and minus sign for both mantissa and exponent. The display usually comprises liquid crystal devices (LCD), although visible light emitting diodes, vacuum fluorescent displays, or a gas discharge panel, for example, may also be used with appropriate interface circuitry. The calculator is a selfcontained unit having a power supply in the form of a battery or batteries within the housing 410, although an AC adapter may be attached, as well as a battery charger if rechargeable nickel cadmium batteries are used.

In place of the usual ON-OFF slide switch which has been used in prior calculators, the calculator of FIG. 1 includes a push-button, momentary contact on switch 414 and 415 are exactly like the remainder of the keyswitches in the keyboard 411 in that they are single-pole single-throw normally open "Form A" switches which remain closed only as long as pressure is manually applied. In contrast, the usual slide switch would remain closed when moved to the ON position, supplying voltage from the battery to the electronic circuitry of the calculator continuously until the switch is manually moved to the OFF position.

In FIG. 6, the general form of the internal structure of the calculator is seen. The keyboard 411 includes an X-Y matrix keyboard device 416 of the type shown in U.S. Pat. No. 4,005,293, issued Jan. 25, 1977, assigned to Texas Instruments. About ten to thirteen rigid wires 419 extend from the end of the keyboard device 416 for connection to the electronic circuitry of the calculator. A calculator chip 420 contains all of the memory, arithmetic and control circuitry, as will be described. The chip 420 is encased in a standard twenty-eight pin dual-in-line plastic package, for example, which is commonly used in the semiconductor industry. Depending upon the complexity of the calculator, and the multiplexing scheme used, the number of pins in the package could be more or less, and also other chip packaging and mounting techniques may be used. The chip 420 is connected to a printed or etched circuit board 421 by soldering the pins to conductors on the board, as are the wires 419. The display 412 is mounted on a small PC board 422, beneath a plastic lens 423 which enhances the visibility of the display. The PC board 422 is mounted on the board 421 by pins soldered to conductors on the board which make the desired connections from the chip 420 to the display. A pair of silver oxide or equivalent batteries 428 are mounted in a compartment behind a door 429 in the housing 410, and is connected to the PC board 421 by wires 425 which are soldered to the PC board at one end and engage terminals of the battery by connectors at the other end.

The simplicity of the calculator is apparent from FIG. 6. It consists of a housing, a keyboard device, a chip, a display device, two small PC boards, and a battery. No components are needed on the board 421 except the chip 420, i.e., no resistors, capacitors, transistors, drivers, or any other devices. Thus, the relative cost savings of eliminating a power switch can be appreciated. The savings will be not only in materials but in assembly time, as well as reliability.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is, therefore, contemplated that the appended claims will cover any such modifications or embodiments as fall within the true scope of the invention.

What is claimed is:

1. A portable, battery operable electronic calculator having a segmented digit display and a display interface system comprising:
   - segment latch means for storing digit segment data received from digit segment data input means;
   - digit group enabling means for selectively enabling one of a plurality of digit segment latch groups of the segment latch means in response to a digit group select input signal to store digit segment data in the selected digit segment latch group; and
   - select logic means connected to the segment latch means for receiving a group of display segment output signals, the select logic means being responsive to a group select signal input, for selectively connecting one of a plurality of subgroups of the display segment output signals to display interface signal converter means for providing a display drive signal.

2. The calculator as in claim 1, wherein
   - the group select signal comprises of M signals;
   - the group of display segment output signals is comprised of N signals;
   - the plurality of subgroups is comprised of M mutually exclusive subgroups;
   - each subgroup is comprised of K display segment output signals, where K equals N divided by M, such that the plurality of subgroups represents the entire group of the display segment output signals.

3. The calculator as in claim 1, wherein the display interface signal converter means is comprised of means for converting steady state binary two-level signals into corresponding periodic 4-level alternating binary signals.

4. A display interface system comprising:

a segmented digit display;

segment data input means for providing digit segment data signals;

segment latch means including a plurality of groups for storing and outputting said digit segment data signals;

digit group enabling means for selectively enabling one of said plurality of groups of the segment latch means in response to a digit group select input signal so as to store said digit segment data signal in the selected digit segment latch group;

means for providing a group select signal;

select logic means coupled to the segment latch means for receiving a selected group of digit segment data signals, the select logic means being responsive to said group select signal for selectively outputting signals of one of said plurality of groups of the digit segment output signals; and display interface signal converter means for providing a display drive signal to said segmented display responsive to said select logic means output signals.

5. The display interface system as in claim 4, wherein the group select signal is comprised of M signals;

the group of display segment output signals is comprised of N signals;

the plurality of groups is comprised of M mutually exclusive subgroups;

each subgroup is comprised of K display segment output signals, where K equals N divided by M, such that the plurality of subgroups represents the entire group of the display segment output signals.

6. The display interface system as in claim 4, wherein the display interface signal converter means is comprised of means for converting steady state binary two-level signals into corresponding periodic 4-level alternating binary signals.

* * * * *